Oct. 28, 1930.    O. N. FARLEY    1,779,623
CONCAVE WORM STEERING DEVICE FOR AUTOMOBILES
Filed Dec. 6, 1929
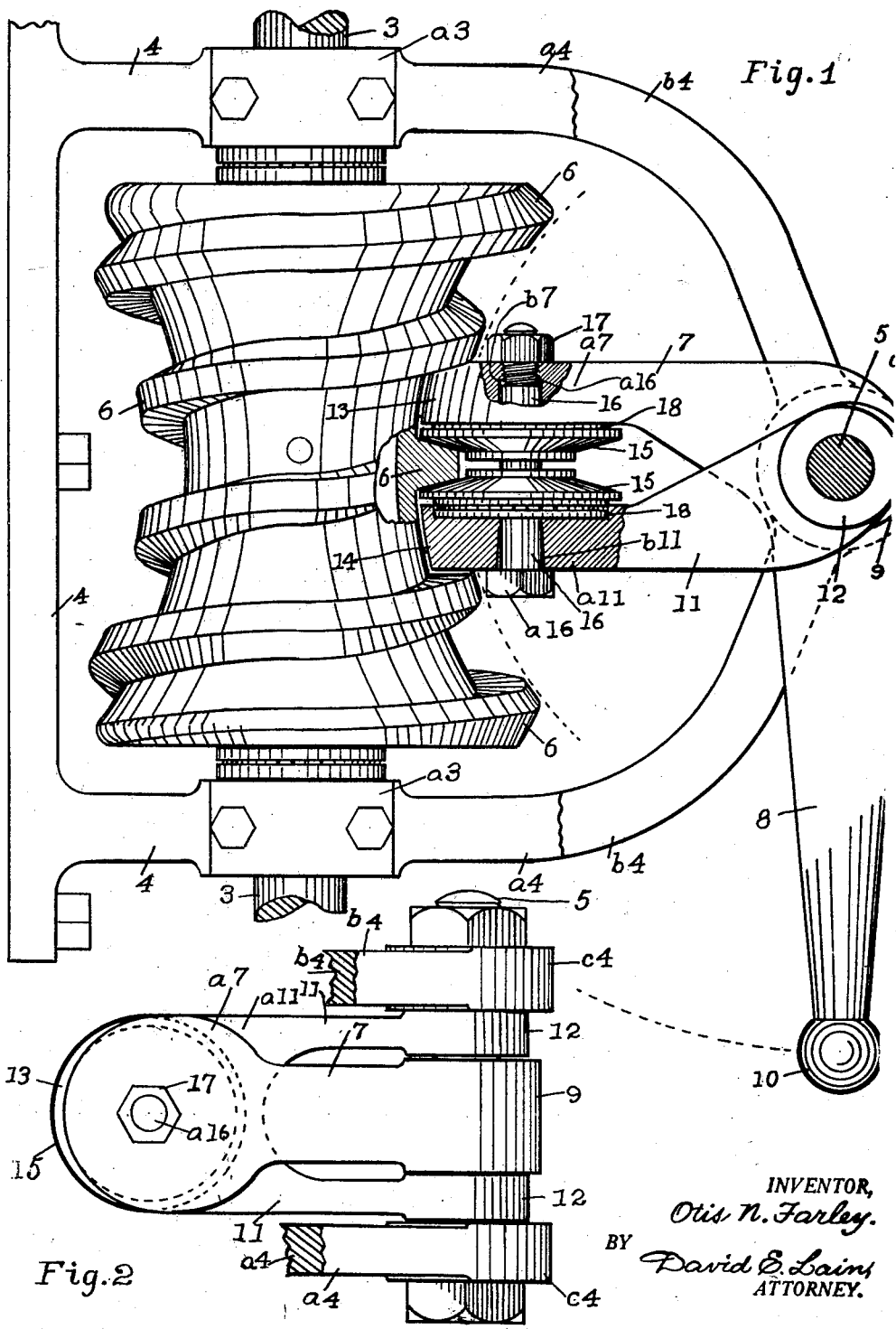
INVENTOR,
Otis N. Farley.
BY David E. Lain,
ATTORNEY.

Patented Oct. 28, 1930

1,779,623

UNITED STATES PATENT OFFICE

OTIS N. FARLEY, OF LYNDEN, WASHINGTON

CONCAVE WORM STEERING DEVICE FOR AUTOMOBILES

Application filed December 6, 1929. Serial No. 412,009.

My invention relates to improvements in concave-worm steering devices for automobiles and is an improvement on an invention for which my application for Letters Patent Serial No. 241,645 was filed Dec. 21, 1927, now matured into Patent No. 1,750,585, and has for an object to provide a stronger and more simple construction than was disclosed in said application.

Another object of my improvement is to provide more effective adjusting means than provided by said prior invention.

I attain these and other objects of my improvement with the mechanism illustrated in the accompanying sheet of drawings, which form a part of this specification, in which Figure 1 is a front elevation of my steering device with the parts thereof in operative position and Fig. 2 is a plan view of the mechanical connections between the worm and the drag link with the remainder of the device broken away.

Similar characters refer to similar parts throughout. Certain parts are broken away to show other parts hidden thereby.

With more particular reference to the designated parts: Steering-wheel shaft 3 is mounted for revolution in bearings $a^3$, $a^3$ on bearing bracket 4 which is suited for fastening to the frame of the automobile. Said bearings are on arms of said bracket which beyond the same are bifurcated to form loops $a^4$, $b^4$ which terminate in lugs $c^4$, $c^4$ which have aligned holes therethrough in which is extended lever axle bolt 5 disposed at right angles with steering wheel shaft 3. Between bearings $a^3$, $a^3$ on bracket 4 worm 6 is concentrically fastened on shaft 3 for revolution therewith. The sides of worm 6 are preferably beveled as shown. Lever axle bolt 5 is so disposed that its axis is in the common center of the concavity of worm 6 as it revolves with shaft 3.

A bell crank having arms 7 and 8 has a bearing 9 by which it is mounted on lever axle 5 preferably centrally between bracket lugs $c^4$, $c^4$. Bifurcated arm 11, 11 has bearings 12, 12 in line mounted on said lever axle for oscillation preferably between lugs $c^4$, $c^4$ with bell crank bearing 9 intervening. Bell crank arm 7 terminates in spatulate end $a^7$ which is disposed opposite end $a^{11}$ of arm 11 when said arms are in operative position; and, when in said position an outwardly tapering hole $b^{11}$ in end $a^{11}$ is aligned with a cylindrical hole $b^7$ through end $a^7$. The outer end of hole $b^7$ is of reduced diameter and is tapped to engage the threaded end of axle bolt 16 which is extended through said holes $b^{11}$ and $b^7$ in arms 11 and 7 respectively. Central with holes $b^{11}$ and $b^7$ are annular recesses in the facing sides of arms 11 and 7 in which are mounted thrust ball bearings 18, 18.

Mounted for revolution on axle bolt 16 between said thrust bearings are a pair of beveled wheels 15, 15 disposed thereon with beveled surfaces facing each other. Said beveled wheels are shaped to fit the beveled sides of worm 6 and engage said worm between them. The construction provides that, when said parts are in operative position, bolt 16 serves as an axle on which bevel wheels 15, 15 may revolve, the head $a^{16}$ of said bolt bears on the outer side of arm 11, the threaded end of said bolt is engaged with the threaded outer end of hole $b^7$ in the bell crank and protrudes to be engaged by set nut 17. Also, as stated, the outer end of hole $b^{11}$ is enlarged while the inner end thereof closely fits bolt 16 and said bolt also fits snugly in the cylindrical part of hole $b^7$ which is extended beyond the body of the bolt to provide for the closer approach of arms 7 and 11 to take up wear, and the taper of hole $b^{11}$ permits said closer approach without cramping arm 11 on axle bolt 5.

As shown, wheels 15, 15 bear against the sides of worm 6 in close moving contact therewith, and when wear occurs on these surfaces of contact sufficient to cause undesirable backlash therebetween, they may again be brought into close operative relation by turning bolt head $a^{16}$ forward after which the new adjusted positions may be secured by turning set nut 17 to again bear on $a^7$.

The peripheries of thrust bearings 18 closely approach the peripheries of bevel wheels 15 providing frictionless bearings in the line of thrust on these wheels from worm 6 when in operation directing the automobile's movements. In this mechanism bolt 16 serves as an axle for wheels 15, to retain arms 7 and 11 in operative relation and to adjust the relation of said arms.

The outer end of arm 8 of the bell crank is preferably provided with ball 10 for engagement with the socket end of a drag link, not shown, connected with the steering knuckles of the automobile not shown.

As shaft 3 is revolved by the steering wheel in steering operations worm 6 passes between wheels 15 causing them to revolve on axle 16 and also moving them, together with arms 7 and 11 about lever axle 5, in the direction indicated by one of the dotted arcs leading therefrom in Fig. 1 depending on the direction of revolution of said steering wheel. This movement causes an opposite one by ball 10 along one of the dotted arcs leading therefrom. Thus, by revolving said steering wheel said ball 10 may be oscillated on lever axle 5 as desired and said movements will be transmitted to the said steering knuckles in the usual way by means of the usual mechanical connections between said knuckles and ball 10.

Having thus disclosed my invention, what I claim as new therein and desire to secure by Letters Patent is—

1. An automobile concave-worm steering device consisting of a steering wheel shaft, a concave worm concentric with said shaft fastened thereon for revolution therewith, a lever axle at right angles with said steering wheel shaft the axis of which is in the common center of the concavity of said worm as it revolves with said steering wheel shaft, a lever mounted for oscillation on said lever axle having one end thereof disposed between adjacent turns of said worm, an arm mounted for oscillation on said lever axle having its end disposed between adjacent turns of said worm proximate said one end of said lever with said worm intervening, means to retain said one end of said lever and said end of said arm in bearing relation with and on opposite sides of said worm to engage the same thereby, the other end of said lever connectable with the steering knuckles of an automobile, and a bracket fastenable to the frame of said automobile to provide supports for said lever axle and bearings for said steering wheel shaft.

2. An automobile concave-worm steering device consisting of a steering wheel shaft, a concave worm concentric with said shaft fastened thereon for revolution therewith, a lever axle at right angles with said shaft having its axis in the common center of the concavity of said worm as it revolves with said steering wheel shaft, a lever mounted for oscillation on said lever axle having one end thereof disposed between adjacent turns of said worm, an arm mounted for oscillation on said lever axle having its end disposed between adjacent turns of said worm proximate to said one end of said lever with said worm intervening, means to retain and adjust said one end of said lever and said end of said arm in bearing relation with and on opposite sides of said worm to engage the same therebetween, the other end of said lever connectable to the steering knuckles of said automobile, and a bracket fastened to the frame of said automobile to provide support for said lever axle and bearings for said steering wheel shaft.

3. An automobile concave-worm steering device consisting of a steering wheel shaft, a concave worm having beveled sides fastened on said shaft concentric therewith, a lever axle at right angles with said shaft having its axis in the common center of the concavity of said worm as it revolves with said steering wheel shaft, a lever mounted for oscillation on said lever axle having a hole through one end thereof in the plane of said steering wheel shaft, an arm mounted for oscillation on said lever axle having a hole through its end alignable with said hole through said lever end, an axle bolt extended through said aligned holes to retain said lever and arm ends in operative proximity and to adjust the space therebetween, a pair of beveled wheels mounted for revolution on said axle bolt between the ends of said lever and said arm disposed on opposite sides of said beveled worm retained with adjustable bearing operative pressure against said beveled sides of said worm by said axle bolt, the other end of said lever connectable to the steering knuckles of said automobile, and a bracket fastenable to the frame of said automobile to provide support for said lever axle and bearings for said steering wheel shaft.

OTIS N. FARLEY.